United States Patent
Rönnmark et al.

(10) Patent No.: US 6,240,646 B1
(45) Date of Patent: Jun. 5, 2001

(54) DEVICE FOR MEASURING ANGLES

(75) Inventors: Ulf Rönnmark, Skellefteå; Ingemar Brännström, Bureå; Rickard Åström, Skellefteå, all of (SE)

(73) Assignee: Pullmax Ursviken AB, Ursviken (SE)

( * ) Notice: Subject to any disclaimer, the term of this patent is extended or adjusted under 35 U.S.C. 154(b) by 0 days.

(21) Appl. No.: 09/254,589
(22) PCT Filed: Jul. 6, 1998
(86) PCT No.: PCT/SE98/01327
§ 371 Date: Apr. 20, 1999
§ 102(e) Date: Apr. 20, 1999
(87) PCT Pub. No.: WO00/00308
PCT Pub. Date: Jan. 6, 2000

(30) Foreign Application Priority Data

Jun. 26, 1998 (SE) .................................... 9802288

(51) Int. Cl.⁷ .............................. G01B 21/32; G01B 3/56
(52) U.S. Cl. ............................. 33/1 PT; 33/1 N; 33/534; 33/538; 33/549
(58) Field of Search .................... 33/1 PT, 534, 33/538, 1 N, 549, 555

(56) References Cited

U.S. PATENT DOCUMENTS

| | | | |
|---|---|---|---|
| 4,571,834 * | 2/1986 | Fraser et al. ..................... | 33/1 PT |
| 4,766,675 * | 8/1988 | Liu .................................. | 33/534 |
| 5,148,693 * | 9/1992 | Santorio et al. ................ | 72/12 |
| 5,285,668 * | 2/1994 | Tokai .............................. | 72/17.3 |
| 5,375,340 * | 12/1994 | Gerritsen ....................... | 33/534 |
| 5,483,750 * | 1/1996 | Ooenoki et al. ............... | 33/534 |
| 5,603,236 * | 2/1997 | Hongo ............................ | 33/1 N |

FOREIGN PATENT DOCUMENTS 0 594 532 4/1997 (EP) .
8105266 * 6/1983 (NL) ............................ 33/1 N

* cited by examiner

*Primary Examiner*—Diego Gutierrez
*Assistant Examiner*—Lydia M. DeJesús
(74) *Attorney, Agent, or Firm*—Ware, Fressola, Van der Sluys & Adolphson LLP

(57) ABSTRACT

A device for measuring angles, primarily for measuring bending angles attained by press brakes and similar when a piece to be worked is bent between upper and lower pressing tools (1), includes an oscillating device (6) that detects the angled position of the piece to be worked. The detection device comprises a rocker (6) that is connected directly to a detecting mechanism (12) such as, for example, a rotating potentiometer. The rocker is arranged to pivot around an axis (5) that runs parallel with the longitudinal axis of the lower pressing tool. In its turn, the axis shaft (5) is supported by a supporting and displacement device (3, 4) that can displace the axle, and thereby the rocker, towards and away from the piece to be worked at an oblique angle to the relative direction of movement of the upper and lower pressing tools.

11 Claims, 3 Drawing Sheets

DEVICE FOR MEASURING ANGLES

BACKGROUND OF THE INVENTION

1. Technical Field

The invention refers to a device for measuring angles, in particular for measuring angles that occur when bending sheet metal and similar material by means of press brakes and other bending devices.

2. Description of the Prior Art

It is known to arrange a displaceable feeler pin at the die of a press brake in the direction of pressing where the feeler pin affects an electronic position detector as the sheet is bent so that a value of the angle of bending is obtained.

A device is known from EP 0 594 532 where a plate mounted for rotation with a detecting edge positioned along a chord is turned under the influence of a sheet bent against a die whereby the rotated position gives the degree of bending. A common factor of known detectors of the latter type is that the rotating element, plates and similar, must have a defined axis that is positioned in a specified relation to the radius over which the bending takes place in order for a secure measurement to be obtained. With other types of devices, one has tried to solve this problem by ensuring good contact fit by allowing some kind of spring mechanism to press the actual detector against the piece being worked. In addition to these known devices often giving an uncertain result, they can only be used together with a specific die set, which means that one is forced to stock an angle measuring mechanism for each die set.

THE OBJECTIVE OF THE INVENTION

The objective of the invention is to achieve a new measuring device that can be used together with a range of different die sets, that is essentially independent of the position of the axis or line over which the bending takes place, and that eliminates the risk of error when transferring data between the detection unit and the registration unit.

SUMMARY OF THE INVENTION

The device according to the invention, whereby there is at least one device arranged on each side of the lower pressing tool, includes a rocker with an abutment edge that can be displaced at right angles to the axis of the rocker by means of a rod that is displaceable in an axial direction. The rod can be displaced obliquely against the direction of movement of the upper pressing tool towards the lower pressing tool, whereby the displacement takes place from the outer side of the sheet whose angle is to be measured. A sensing edge of the rocker is arranged to be brought in contact with the outside or the underside of the sheet or the piece being worked.

The lower pressing tool part, or die, supports the sheet along its radius or edges and the upper pressing tool is arranged to press the sheet between the two, whereby the parts of the plate, or the work piece, that are outside of or beyond the radii or edges are swung upwards.

During measurement, the pivoting axis of the rocker, which is parallel with the longitudinal direction of the press brake, is displaced upwardly beyond the radius of bending or the bending edge at the lower pressing tool. The sensing edge of the rocker is moved to abut the outside or the underside of the sheet. The angular position of the rocker, which gives the bending angle, is detected by means of a directly connected detector mechanism, such as a rotating potentiometer.

The device designed as one single unit together with the rocker, rod, the operating mechanism for same, and a support part is located in a housing that can be attached to various tools with the help of an attachment mechanism.

BRIEF DESCRIPTION OF THE DRAWINGS

The invention will be described in greater detail below with reference to the accompanying drawings, where.

DETAILED DESCRIPTION OF THE DRAWINGS

The number 1 designates a section of a lower pressing tool. This section is a short piece designed so that it can be arranged with different lower pressing tools at press brakes to support the angle-measuring device according to the invention. The section with the angle measuring device can be mounted in an end device arranged in advance in the respective lower pressing tool to thus form an integrated part. A housing 2 that houses the device according to the invention is attached to part 1 by means of a suitable screw or other attachment device.

Figure 7:
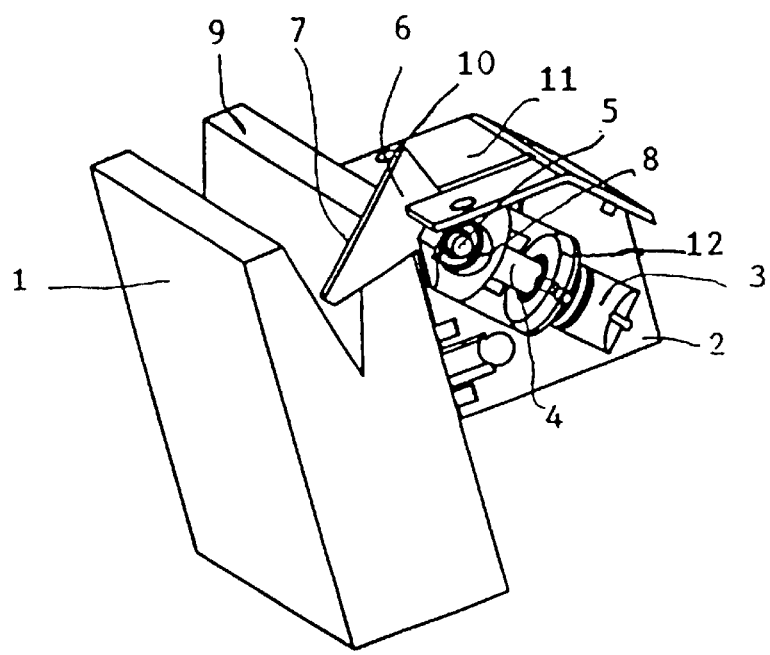
FIG. 7 shows the device according to FIG. 5 in cut-away view to reveal the measuring mechanism found inside.

An obliquely arranged cylinder 3 (FIG. 7) is arranged in the interior of housing 2, in which a plunger or rod 4 can be displaceably guided with the help of a pressurised medium. A rocker 6 is mounted by means of an axle 5 at the free end of the rod 4. The displacement preferably takes place at an angle of essentially 45° to the pressing direction.

Cylinder 3 can be single or double-acting and, in the case where the cylinder is single-acting, the rod can be provided with a return mechanism, for example a spring, that displaces the rod in one of the directions.

Figure 5:
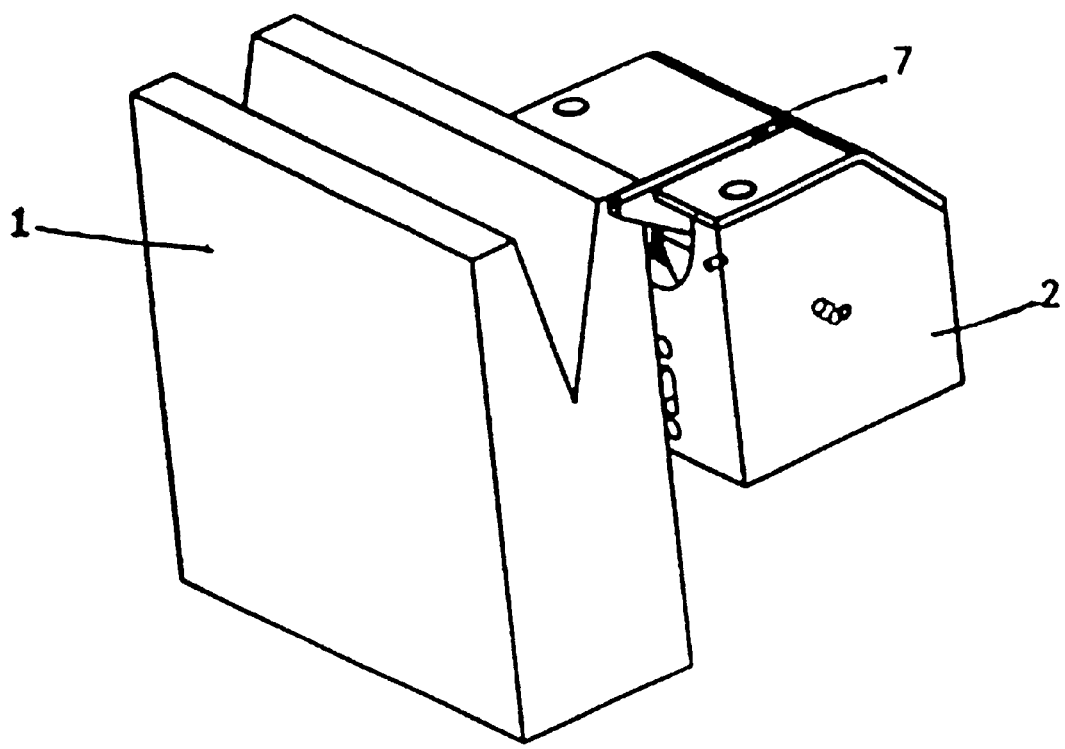
FIGS. 5 and 6 show respectively perspective views of the device in resting position and when measuring the angle of a piece being worked (not shown)
Figure 6:
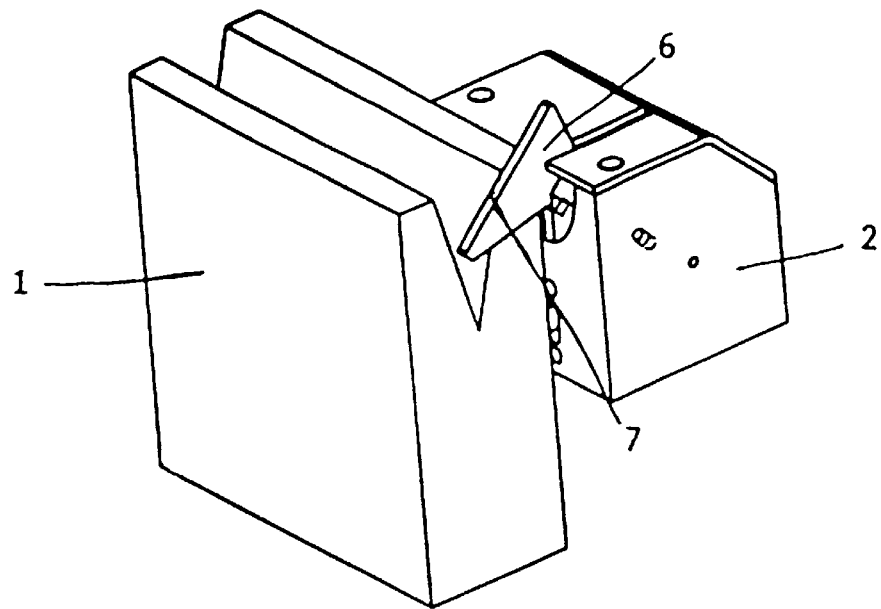

The rocker 6 has an elongated sensing edge 7 and opposite to this, a projection 8 with an opening for the axle 5 that is positioned so that the rocker 6 is asymmetric. In the rocker's resting position (FIG. 5), the sensing edge 7 occupies a recessed position, whereby the sensing edge 7 is essentially in the same plane as the upper surface 9 of the tool 1 and the upper section 11 of the housing. The design of the rocker 6 is such that it flips over towards the center plane of the tool 1 as soon as it starts to move obliquely upwards from its resting position by means of the rod 4. When this happens, the upper free corner 10 initially reaches the surface of the work piece 13 and, during further displacement of the rod 4, the rocker's sensing edge 7 comes to lie against the work piece along the whole of its length. This avoids the rocker 6 stopping in an intermediate position.

As has already been mentioned, the devices according to the invention are preferably mounted in pairs along the lower pressing tool. The housing 2 is suitably provided with a screw fastening that fits with pre-threaded bores in the outwards facing sides of the lower pressing tool. The devices on either side of the lower pressing tool are displaced somewhat in the longitudinal direction of the lower pressing tool. This prevents the rockers of both devices from interfering with one another.

A detection mechanism 12 is directly connected at the axle 5 of the rocker arm 6. In the preferred embodiment, this detection mechanism 12 includes a rotary potentiometer.

Even other measuring mechanisms to detect changes of angles can naturally be used. With the help of the directly connected detection mechanism 12, the rocker arm's 6 angled position can be detected with good precision and the angle of bending attained can be read.

As already mentioned, the devices according to the invention are mounted in pairs, one on each side of the lower pressing tool and, depending on the length of the tool, several pairs of devices can be mounted. During the bending process, one side of the sheet could be bent more than the other, but the differences are evened out when the upper pressing tool 14 has reached the end position for the bending. The mounted pairs of devices allow the changes of angle to be measured and noted during the entire bending process.

Figure 1:
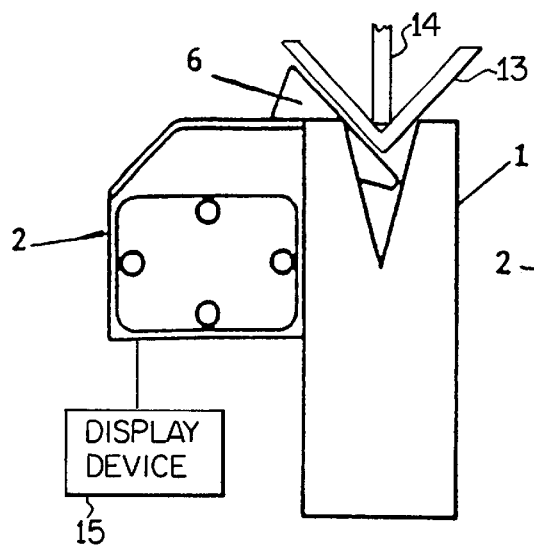
FIGS. 1, 2, 3 and 4 show respectively the side, front, top and perspective views of the device according to the invention in its entirety.
Figure 2:
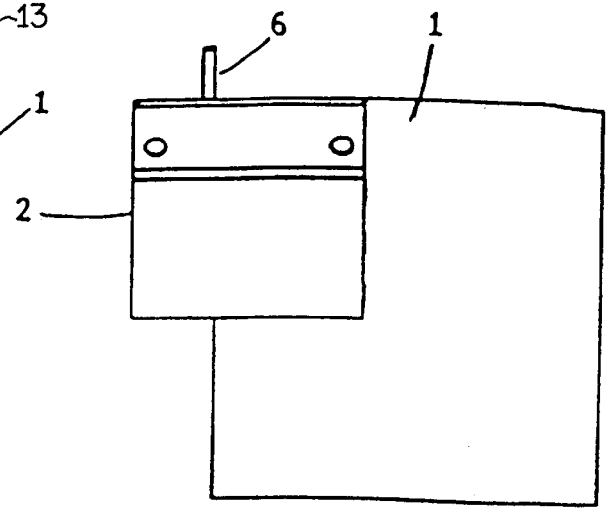
Figure 3:
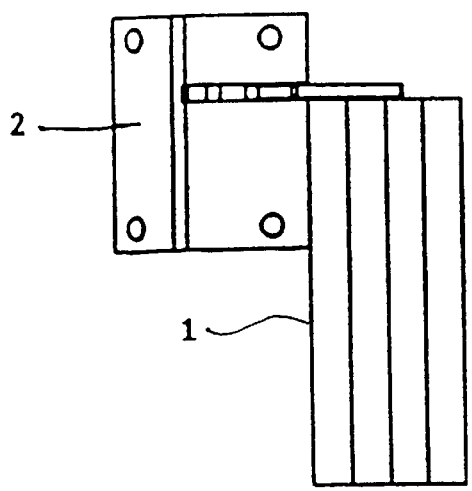
Figure 4:
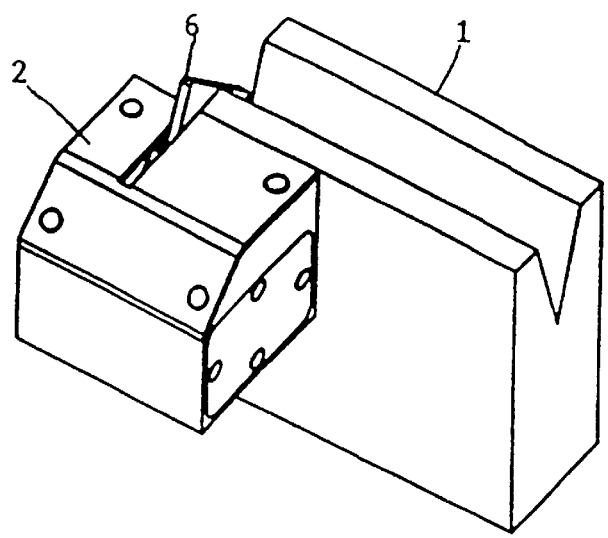

In FIG. 1, the sheet-like work piece 13, with the help of the upper pressing tool 14 has begun to be pressed down between both longitudinal edges of the lower pressing tool 1. Here, the radius over which the bending takes place, i.e. the edges of the lower pressing tool that engage with the sheet 13, has no essential significance for the process of bending since the aim is to achieve a specific angle between the mutualy bent sections of the piece 13 being worked.

During the time that the bending process is taking place, the sensing contact edge 7 of the rocker 6 at each respective device will lie against the outside of the piece 13 being worked by rod 4 pushing up the rocker 6. As the degree of bending increases, the rocker 6 swings out more and more from its recessed resting position, whereby the detection mechanism 12 directly connected to the rocker arm 6 successively reads the changing angle of the rocker 6 and, in a manner suitable for the purpose e.g. display device 15), registers and/or displays this.

It is obvious for a person skilled in the art that the device according to the invention can be designed in ways other than that shown and described without exceeding the scope of the patent protection. As such, the displacement of the carrying and supporting device can have a different angle than that described, the rocker and the device's housing can be designed in another way, and the detection mechanism and the carrying and supporting device can be of another type, as can the attachment devices, etc.

What is claimed is:

1. In a device for measuring angles in a machine where a sheet-like workpiece is to be pressed to a certain angle by a relative direction of movement of an upper pressing tool and a lower pressing tool having an engaging edge and a center plane, the device comprises:

(a) a shaft extending parallel with the engaging edge of the lower pressing tool;

(b) a pivotably arranged asymmetric rocker supported by the shaft, the rocker having a sensing edge arranged to engage with the workpiece that is to be pressed to a certain angle;

(c) a detecting mechanism directly connected to the shaft for sensing angular position of the rocker thereon;

(d) a display device operationally connected to the detecting mechanism for displaying the angular position sensed by the detecting mechanism; and (e) a supporting and displacement device supporting the shaft and thereby the rocker and arranged to displace the rocker at right angles to the shaft and in an oblique direction in relation to the relative direction of movement of the upper pressing tool and the lower pressing tool whereby the rocker moves toward the center plane of the lower pressing tool upon upward movement in the oblique direction.

2. Device according to claim 1, wherein the supporting and displacement device is displaceable at an angle of essentially 45° to the relative direction of movement of the upper and lower pressing tools.

3. Device according to claim 2, wherein the supporting and displacement device is displaceable to a position for measuring angles where an axis of rotation of the rocker is located at a distance from the engaging edge of the lower pressing tool and running above and parallel therewith, whereby the sensing edge of the rocker is inclined to contact an outside portion of the workpiece.

4. Device according to claim 3, wherein the supporting and displacement device includes a piston and cylinder device that is operable by a pressurized medium.

5. Device according to claim 4, wherein the shaft, the detection mechanism and the supporting and displacement device form a unit that is arranged in a housing adapted to be moved between different tools for fitting into attachment devices arranged on the different tools.

6. Device according to claim 3, wherein the shaft, the detection mechanism and the supporting and displacement device form a unit that is arranged in a housing adapted to be moved between different tools for fitting into attachment devices arranged on the different tools.

7. Device according to claim 2, wherein the supporting and displacement device includes a piston and cylinder device that is operable by a pressurized medium.

8. Device according to claim 7, wherein the shaft, the detection mechanism and the supporting and displacement device form a unit that is arranged in a housing adapted to be moved between different tools for fitting into attachment devices arranged on the different tools.

9. Device according to claim 2, wherein the shaft, the detection mechanism and the supporting and displacement device form a unit that is arranged in a housing adapted to be moved between different tools for fitting into attachment devices arranged on the different tools.

10. Device according to claim 1, wherein the detection mechanism is a rotary potentiometer.

11. Device according to claim 10, wherein the shaft, the detection mechanism and the supporting and displacement device form a unit that is arranged in a housing adapted to be moved between different tools for fitting into attachment devices arranged on the different tools.

* * * * *

UNITED STATES PATENT AND TRADEMARK OFFICE
CERTIFICATE OF CORRECTION

PATENT NO. : 6,240,646 B1
DATED : June 5, 2001
INVENTOR(S) : Ulf Rönnmark, Ingemar Brännström and Rickard Aström It is certified that error appears in the above-identified patent and that said Letters Patent is hereby corrected as shown below:

Column 2,
Line 19, "Drawings" should be -- Invention --.

Column 3,
Line 16, after "14", -- , -- should be inserted.
Line 31, before "e.g.", -- ( -- should be inserted.

Signed and Sealed this

Fifteenth Day of January, 2002

JAMES E. ROGAN
Director of the United States Patent and Trademark Office